(12) United States Patent
Vaandrager et al.

(10) Patent No.: US 7,600,735 B2
(45) Date of Patent: Oct. 13, 2009

(54) SLIDING CLIP TO RETAIN A CAPTURED NUT

(75) Inventors: Gary J. Vaandrager, Livonia, MI (US); Richard K. Marsh, Shelby Township, MI (US); Alan E. Rice, New Baltimore, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 566 days.

(21) Appl. No.: 11/171,039

(22) Filed: Jun. 30, 2005

(65) Prior Publication Data

US 2007/0012854 A1 Jan. 18, 2007

(51) Int. Cl.
*A47G 25/12* (2006.01)
*F16B 37/04* (2006.01)

(52) U.S. Cl. .................. 248/535; 248/534; 248/675; 411/174; 411/182; 411/353

(58) Field of Classification Search ............. 248/674, 248/675, 534–536, 3–354, 451.1; 411/965, 411/967, 999, 172–176, 182–183, 353–354, 411/451.1; 123/196 R, 195 R, 195 A
See application file for complete search history.

(56) References Cited

U.S. PATENT DOCUMENTS

| | | | | | |
|---|---|---|---|---|---|
| 4,729,706 | A | * | 3/1988 | Peterson et al. | 411/175 |
| 5,692,953 | A | * | 12/1997 | Bell et al. | 411/182 |
| 5,694,719 | A | * | 12/1997 | Bejune et al. | 411/182 |
| 5,713,707 | A | * | 2/1998 | Gagnon | 411/175 |
| 5,769,292 | A | * | 6/1998 | Cucheran et al. | 224/324 |
| 5,822,918 | A | * | 10/1998 | Helfman et al. | 47/39 |
| 6,261,042 | B1 | * | 7/2001 | Pratt | 411/551 |
| 6,688,825 | B1 | * | 2/2004 | Stewart et al. | 411/174 |
| 6,866,456 | B2 | * | 3/2005 | Bentrim | 411/353 |
| 7,096,845 | B1 | * | 8/2006 | Vaandrager et al. | 123/196 R |
| 2005/0284995 | A1 | * | 12/2005 | Hutter, III | 248/235 |

* cited by examiner

*Primary Examiner*—J. Allen Shriver
*Assistant Examiner*—Tan Le

(57) ABSTRACT

A bracket and nut assembly includes a first bracket, a second bracket and a captured nut. The first bracket includes a body with first end having with an aperture extending therethrough. The second bracket includes a first end with an elongated aperture and a second end moveably attached to the body portion of the first bracket. A captured nut is retained within the elongated aperture. The nut includes a first piece coupled to a second piece and is axially translatable and rotatable within the elongated aperture.

14 Claims, 5 Drawing Sheets

SLIDING CLIP TO RETAIN A CAPTURED NUT

FIELD OF THE INVENTION

The present invention relates to self-retained fasteners and, more particularly, to a captured nut retained on a clip. The clip and nut are moveably coupled to a bracket.

BACKGROUND OF THE INVENTION

Threaded fasteners have been used to interconnect automotive components for years. Typically, a bolt having an externally threaded shaft is mated with a nut having an internally threaded aperture to provide a clamping force to members positioned between the bolt and the nut. During the assembly of complex machines such as automotive engines, the fasteners may be dropped or misplaced. Unfortunately, the dropped fastener may become trapped within an internal cavity of the engine and possibly cause significant damage. If multiple components must be handled and positioned during the fastener installation process, the likelihood of dropping the fastener increases. Accordingly, it may be desirable to attach a fastener, such as a nut, to a component that is to be mounted on the engine and thereby eliminate the risk of dropping the nut within the engine cavity. Furthermore, it may be desirable to provide a component and nut assembly including a translatable clip having a rotatable nut to allow mounting the component on an existing stud that extends from the engine.

SUMMARY OF THE INVENTION

The present invention provides a bracket and nut assembly including a first bracket having a first end, a second end and a body interconnecting the first and second ends. The first end includes a first substantially planar portion with an aperture extending therethrough. The second bracket has a first end and a second end. The first end of said second bracket includes a first substantially planar portion with an elongated aperture extending therethrough. The second end of the second bracket is moveably attached to the body portion of the first bracket. A nut includes a first piece and a second piece. The second piece is coupled to the first piece and positioned on an opposite side of the first planar portion as the first piece to moveably capture the nut within the elongated aperture.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment is merely exemplary in nature and is in no way intended to limit the invention, its application, or uses.

Figure 1:
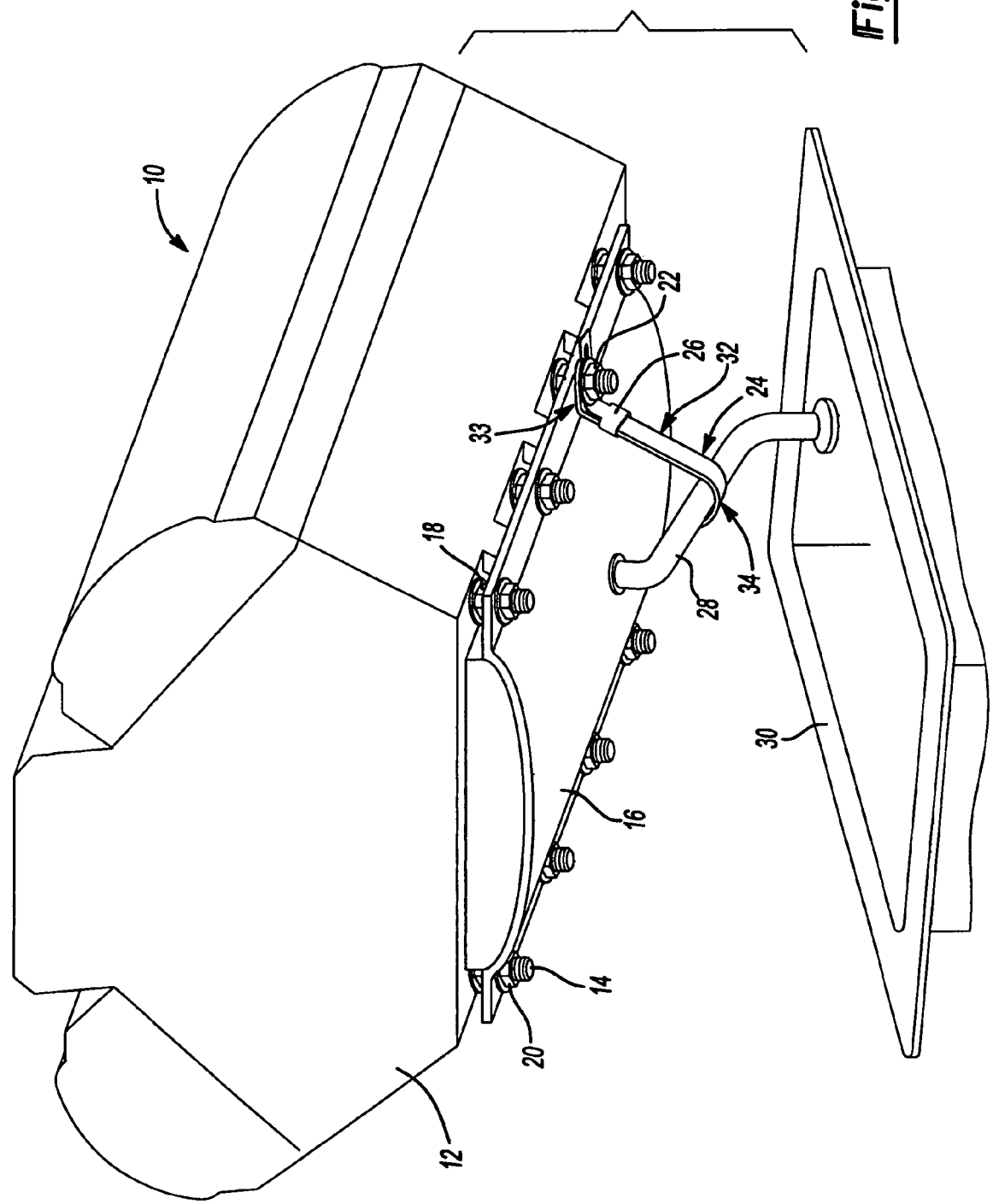
FIG. 1 is a schematic illustration of an internal combustion engine having an exploded view of the lower portion of the engine constructed in accordance with the teachings of the present invention.
Figure 2:
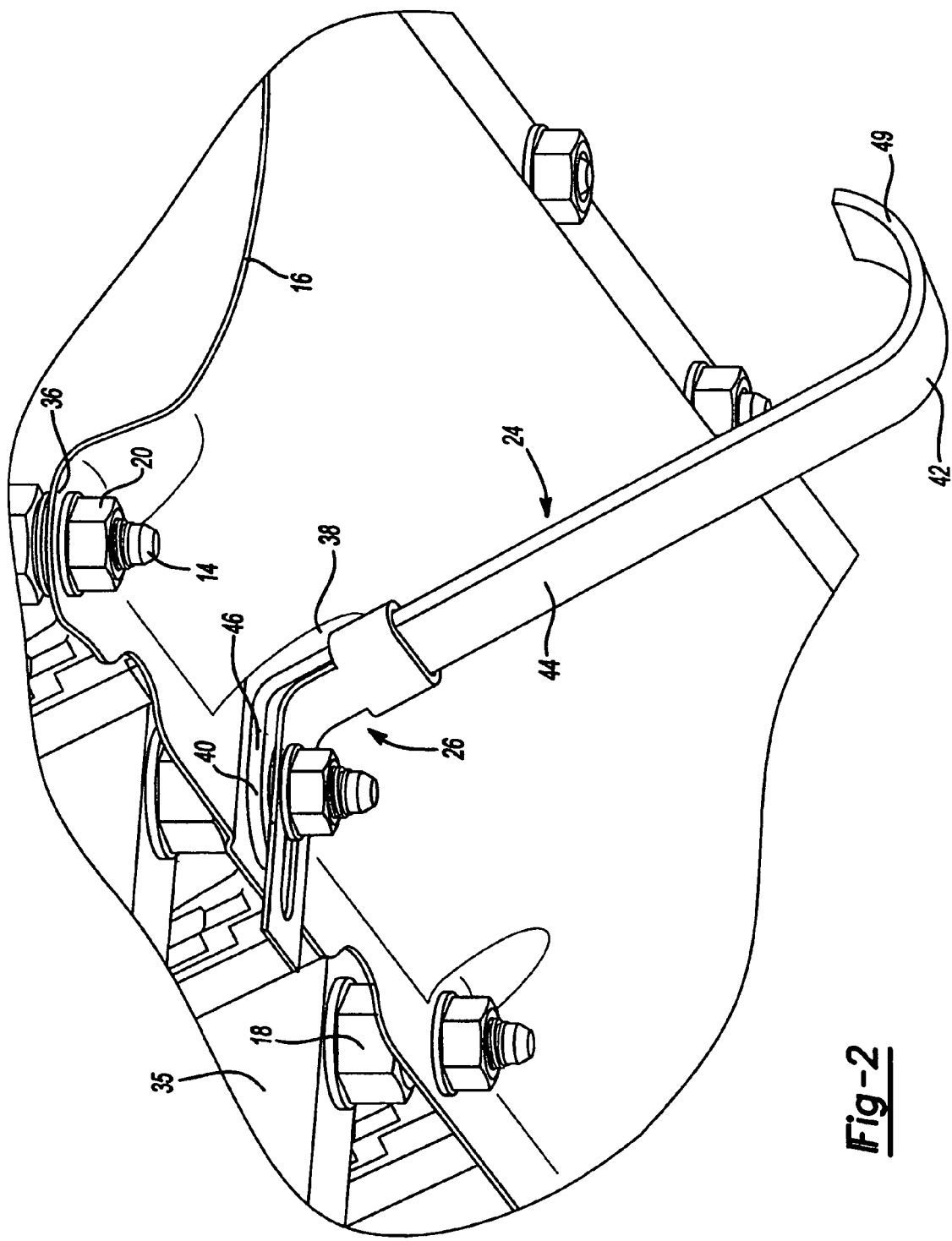
FIG. 2 is a more detailed view of the captured nut assembly.
Figure 3:
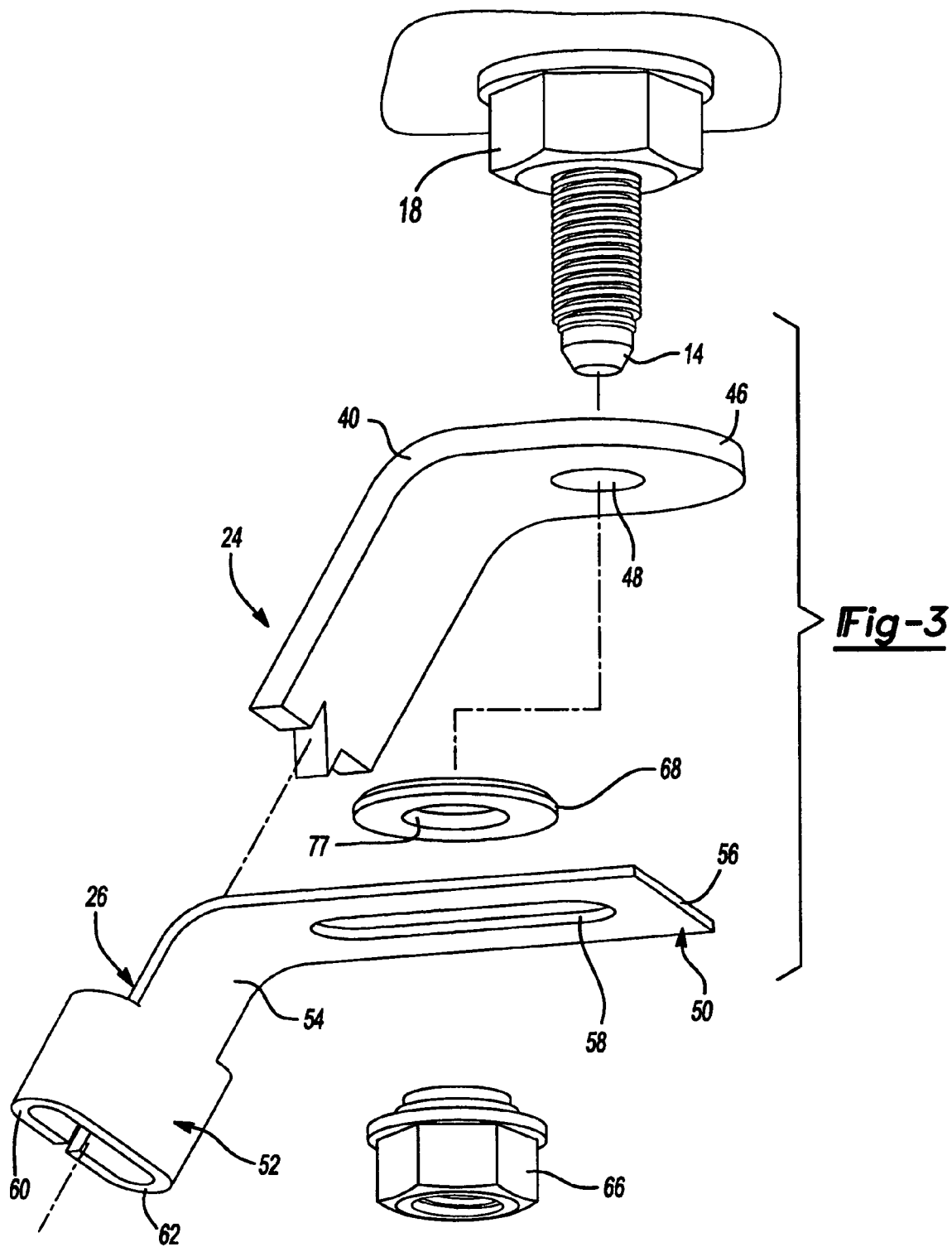
FIG. 3 is an exploded view of the captured nut assembly.

With reference to FIG. 1, an exemplary internal combustion engine 10 is constructed in accordance with the teachings of the present invention. The engine 10 includes a block 12, a plurality of studs 14, a deflector 16, a first plurality of nuts 18, a second plurality of nuts 20, a captured nut 22, a first bracket 24, a second bracket 26, an oil pickup tube 28 and an oil pan 30. The captured nut 22 and the first and second brackets 24, 26 comprise a bracket and captured nut assembly 32. A first end 33 of the first bracket 24 is fastened to one of the bolts or studs 14 extending from the block 12 through the use of the second bracket 26 and the captured nut 22. The oil pickup tube 28 is coupled to a second end 34 of the first bracket 24. The oil pickup tube 28 is in communication with a volume of oil contained within oil pan 30.

FIGS. 2-5 depict the bracket and captured nut assembly 32 in greater detail. Studs 14 extend from a bearing cap 35 of the engine 10. Nuts 18 are coupled to the studs 14 to secure the bearing cap 35 to the block 12. A deflector 16 is located below the nuts 18. The deflector 16 contains a series of apertures 36 to accept the studs 14. Nuts 20 are coupled to the studs 14 below the deflector 16 to fasten the deflector 16 to the block 12. At the location of attachment for the bracket and captured nut assembly 32, the deflector 16 contains a recess 38 to accommodate installation of the bracket and captured nut assembly 32. The recess 38 is generally "U-shaped" and provides clearance for the installation of the bracket and captured nut assembly 32.

The first bracket 24 includes a body portion 44 interconnecting the first end 33 and the second end 34. The first end 33 includes a substantially planar portion 46. An aperture 48 extends through the substantially planar portion 46. The body portion 44 is elongated and extends at an angle between thirty and sixty degrees from the substantially planar portion 46 to position the second end 34 at a location useful for supporting an oil pickup tube 28. The angle between the body portion 44 and the substantially planar portion 46 is beneficial for positioning the oil pickup tube 28 at a location remote from the studs 14. The studs 14 are typically located at the outer edge of the oil pan 30 and the oil pickup tube 28 typically extends across the center of the oil pan 30. The second end 34 includes a substantially "U-shaped" portion 49 adapted to be coupled to the oil pickup tube 28. It should be appreciated that alternate embodiments of the first bracket not shown may define angles less than thirty or greater than sixty degrees between body portion 44 and planar portion 46 without departing from the scope of the present invention.

The second bracket 26 includes a first end 50, a second end 52 and a body portion 54 formed from a single sheet of material. The first end 50 of the second bracket 26 includes a substantially planar portion 56. An elongated aperture 58 extends through the substantially planar portion 56. The substantially planar portion 56 of the second bracket 26 is generally parallel to the substantially planar portion 46 of the first bracket 24. The second end 52 of the second bracket 26 is slidably attached to the body portion 44 of the first bracket 24. The second end 52 includes two tabs 60, 62 formed to face one another. The tabs 60, 62 substantially encompass the body portion 44 of the first bracket 24 to allow the second bracket 26 to slide along the body portion 44 of the first bracket 24. The body portion 54 of the second bracket 26 is substantially planar and extends from the substantially planar portion 56 at an angle of thirty to sixty degrees, or any angle similar to the angle of the first bracket 24. This similar angle allows the substantially planar portion 56 of the second bracket 26 to remain generally parallel to the substantially planar portion 46 of the first bracket 24.

The captured nut 22 is contained in the elongated aperture 58 of the second bracket 26. The captured nut 22 includes a first piece 66 and a second piece 68. The first piece 66 includes four portions 70, 72, 74, 76. The first portion 70 has flats formed in the shape of a hexagon to provide means for applying torque to the captured nut 22. The second portion 72 includes a flange extending radially outwardly from the first portion 70. The third portion 74 is a generally cylindrical body having a diameter less than the diameter of the second portion 72. The fourth portion 76 is comprised of a substantially cylindrical body deformed radially outwardly to retain the second piece 68. An aperture 86 extends through all four portions 70, 72, 74, 76. The wall of the aperture 86 is threaded through the first three portions 70, 72, 74. The third portion 74 of the captured nut 22 is contained within the elongated aperture 58 of the second bracket 26. The width of the elongated aperture 58 is greater than the diameter of the third portion 74, but less than the diameter of the second portion 72. The length of the elongated aperture 58 is greater than its width.

The second piece 68 includes a substantially disk-shaped body having an aperture 77 therethrough. The second piece 68 has an upper surface 78, a lower surface 80, an outer wall 82 and an internal wall 84. The upper surface 78 and lower surface 80 are generally parallel to one another and have the aperture 77 extending therethrough. The outer wall 82 includes a chamfer 88 as the outer wall 82 approaches the lower surface 80. The internal wall 84 is substantially tapered, having a maximum diameter proximate the lower surface 80. The tapered internal wall effectively forms a recess to allow retention of the second piece 68 when the fourth portion 76 of the first piece 66 is deformed radially outwardly into the recess. The outer diameter of the outer wall 82 is greater than the width of the elongated aperture 58. Thus, the captured nut 22 is retained within the elongated aperture 58, free to translate and rotate therein.

Figure 4:
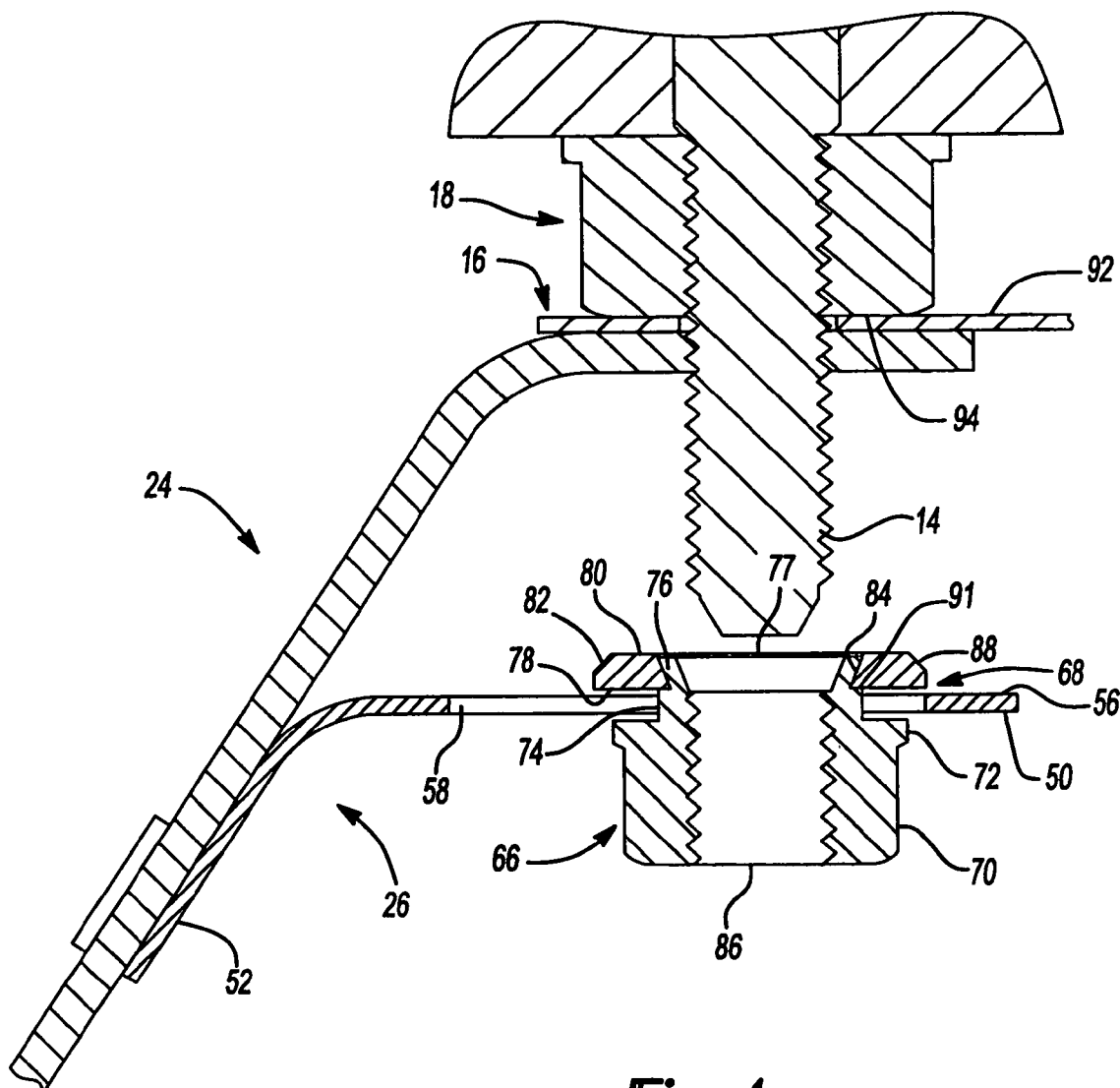
FIG. 4 is a sectional view of the captured nut assembly with the nut disengaged from a stud.
Figure 5:
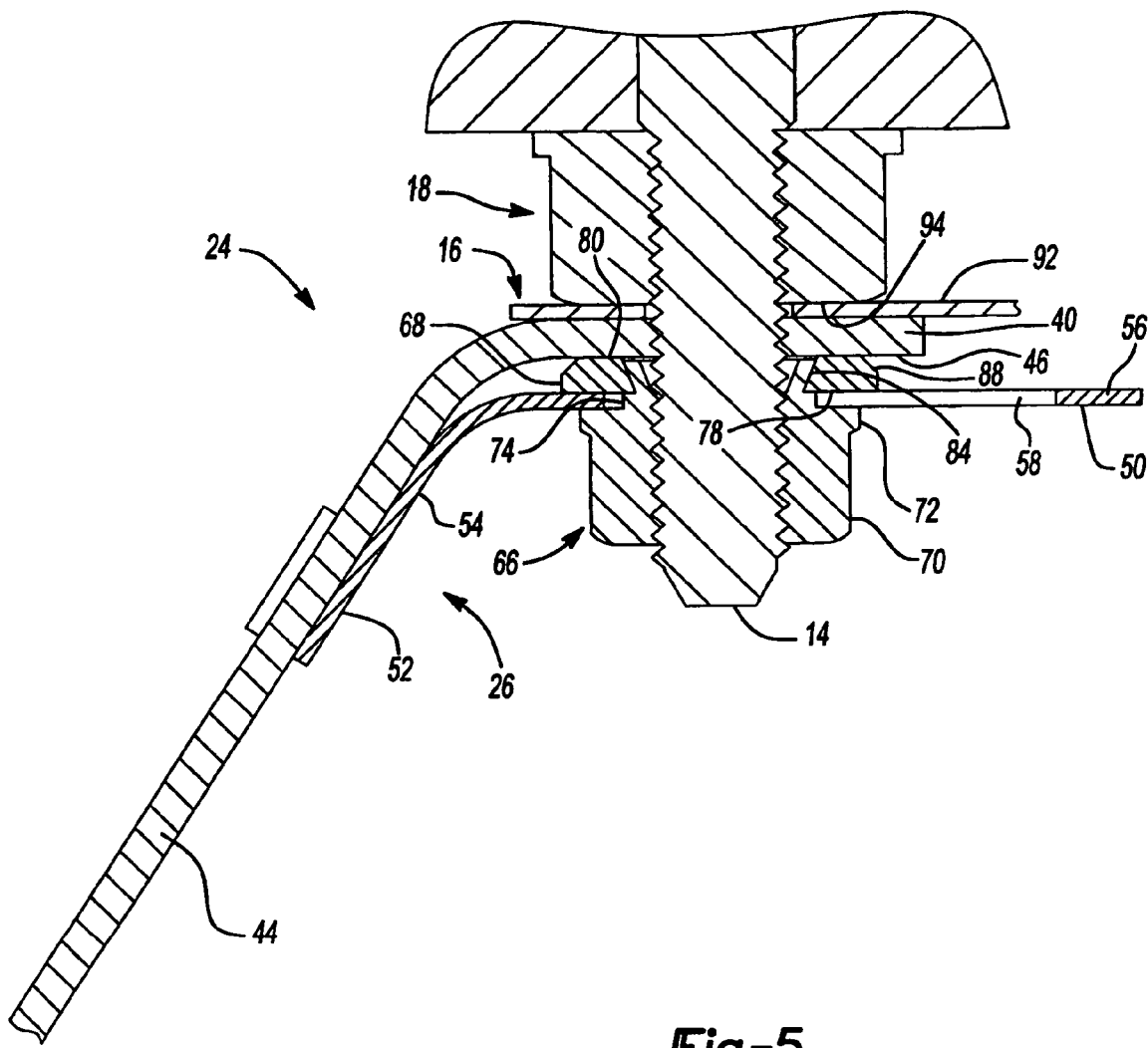
FIG. 5 is a sectional view of the captured nut assembly with the nut engaged with the stud.

As best shown in FIGS. 4 and 5, the length of the substantially planar portion 56 of the second bracket 26 and the length of the elongated aperture 58 contained therein should be sized to allow initial engagement with the stud 14 as shown in FIG. 4. The captured nut 22 should be able to engage the stud 14 when first in contact with the stud 14. The captured nut 22 should be able to continue engagement until the lower surface 80 of the second piece 68 of the captured nut 22 is in contact with the substantially planar portion 46 of the first bracket 24 as shown in FIG. 5. The elongated aperture 58 in the second bracket 26 allows the captured nut 22 to translate along its length as the second bracket 26 advances along the body portion 44 of the first bracket 24. This configuration allows the captured nut 22 to remain in engagement with the stud 14 even though the angled connection requires the substantially planar portion 56 of the second bracket 26 to move radially away from the stud 14 as the nut 22 is tightened.

Bracket and nut assembly 32 is constructed by positioning third portion 74 of first piece 66 within elongated aperture 58 of second bracket 26. Second piece 68 is positioned on an opposite side of substantially planar portion 56 as first piece 66. Upper surface 78 of second piece 68 is placed into engagement with a land 91 formed at the intersection of third portion 74 and fourth portion 76 of first piece 66. Fourth portion 76 is swaged or otherwise deformed to engage internal wall 84 of second piece 68. In this manner, first piece 66 is coupled to second piece 68 thereby capturing nut 22 within elongated aperture 58 of second bracket 26.

The second bracket and nut subassembly is coupled to first bracket 24 by deforming tabs 60 and 62 to at least partially surround the body portion 44 of the first bracket 24. The second end 52 of the second bracket 26 is shaped to define a slip-fit with body portion 44 thereby allowing second bracket 26 to translate relative to substantially planar portion 46 of the first bracket 24. One skilled in the art will appreciate that the second end 52 of the second bracket 26 compliments the substantially rectangular cross-sectional shape of body portion 44 to provide a restriction to rotation of second bracket 26 relative to first bracket 24.

The process of coupling the bracket and captured nut assembly 32 to engine 10 is described below. The first nut 18 is engaged with the stud 14 to secure the bearing cap 35 to the engine block 12. The deflector 16 is positioned to abut the first nut 18 by engaging a first side 92 of the deflector 16 with an end face 94 of the first nut 18. The threaded portion of the stud 14 passes through one of the apertures 36 in the deflector 16.

The bracket and captured nut assembly 32 is positioned such that the threaded portion of the stud 14 extends through the aperture 48 extending through the substantially planar portion 46 of the first bracket 24. The second bracket 26 is translated along the body portion 44 until the captured nut 22 is in engagement with the stud 14. As the captured nut 22 threadingly engages and translates axially down the stud 14, the captured nut 22 also translates along the length of the elongated aperture 58 in the second bracket 26 and freely rotates therein. The captured nut 22 is rotated until a clamping force is exerted between the nut 22 and the first nut 18 thereby clamping the first bracket 24 and the deflector 16 therebetween as shown in FIG. 5.

Furthermore, the foregoing discussion discloses and describes merely exemplary embodiments of the present invention. One skilled in the art will readily recognize from such discussion, and from the accompanying drawings and claims, that various changes, modifications and variations may be made therein without department from the spirit and scope of the invention as defined in the following claims.

What is claimed is:

1. A bracket and nut assembly comprising:
   a first bracket having a first end, a second end and a body interconnecting said first and second ends, said first end including a first substantially planar portion with at least one aperture extending therethrough;
   a second bracket having a first end and a second end, said first end of said second bracket including a first substantially planar portion with at least one elongated aperture extending therethrough, said second end of said second bracket being moveably attached to said body portion of said first bracket; and
   a nut including a first piece and a second piece, said second piece being coupled to said first piece and positioned on an opposite side of said first planar portion as said first piece to moveably capture said nut within said elongated aperture, wherein said second piece includes a recess in receipt of a portion of said first piece thereby coupling said first piece to said second piece and said first piece includes an annular land and a deformable lip axially extending from said annular land, said second piece including a first face engaging said land, said deformable lip being deformed within said recess of said second piece to couple said first piece to said second piece.

2. The bracket and nut assembly of claim 1, wherein said nut is free to translate along the length of said elongated aperture and rotate therein.

3. The bracket and nut assembly of claim 1, wherein said body and said first substantially planar portion of said first bracket form an angle between thirty and sixty degrees.

4. The bracket and nut assembly of claim 3 wherein said first piece includes a radially extending flange having a substantially planar surface engaging said first substantially planar portion of said second bracket.

5. The bracket and nut assembly of claim 1, wherein said second bracket is comprised of a single sheet of material.

6. The bracket and nut assembly of claim 5 wherein said second bracket includes at least two tabs extending from a base, said tabs extending from sides of said base generally opposite one another, said tabs at least partially encompassing said body of said first bracket.

7. The bracket and nut assembly of claim 1, wherein said first bracket includes a substantially rectangular cross-section along its length.

8. The bracket and nut assembly of claim 1, wherein said first piece includes an elongated hollow body having a first portion and a second portion, said first portion defining a size greater than a width of said elongated aperture, said second portion having a reduced size and being at least partially positioned within said elongated aperture.

9. The bracket and nut assembly of claim 1, wherein said second bracket is operable to translate axially along said body of said first bracket.

10. The bracket and nut assembly of claim 9, wherein said first substantially planar portion of said second bracket remains generally parallel to said first substantially planar portion of said first bracket when translated.

11. The bracket and nut assembly of claim 10 wherein said nut includes an internal thread coaxially alignable with said aperture extending through said first bracket.

12. A bracket and nut assembly for supporting a member in an engine, the bracket and nut assembly comprising:
 a first bracket having a first end, a second end and a body interconnecting said first and second ends, said first end including a first substantially planar portion with at least one aperture extending therethrough, said second end being adapted to support the member;
 a second bracket having a first end and a second end, said first end of said second bracket including a first substantially planar portion with an elongated aperture extending therethrough, said second end of said second bracket being slidably attached to said body portion of said first bracket;
 a nut including a body, a deformable portion extending axially from said body, and an internally threaded bore extending through said body; and
 a substantially disk-shaped cap having an aperture extending therethrough, said cap being positioned on an opposite side of said first planar portion as said body of said nut, wherein said deformable portion of said nut extends through said elongated aperture and is deformed to engage said cap to moveably capture said nut within said elongated aperture.

13. The bracket and nut assembly of claim 12, wherein said nut is free to translate along the length of said elongated aperture and rotate therein.

14. The bracket and nut assembly of claim 12 wherein said second bracket includes at least two tabs extending from a base, said tabs extending from sides of said base generally opposite one another, said tabs at least partially encompassing said body of said first bracket.

* * * * *